Sept. 11, 1962 F. S. YOUNG 3,053,032
GAS STRAINER
Filed July 10, 1958

FARRILE S. YOUNG
INVENTOR.

BY Vincent Martin
Joel B. Edwards
M. Harvey Gay
ATTORNEYS.

United States Patent Office 3,053,032
Patented Sept. 11, 1962

3,053,032
GAS STRAINER
Farrile S. Young, Houston, Tex., assignor to Gulf Interstate Oil Company, Houston, Tex., a corporation of Delaware
Filed July 10, 1959, Ser. No. 747,782
4 Claims. (Cl. 55—416)

This invention relates to strainers and more particularly to strainers for gas transmission lines.

Gas is transmitted across a country in large diameter pipes under high pressure. It is necessary to repressure the gas en route and for this purpose, compressor stations are located at spaced points along the line. The cost of equipment and operation of these compressor stations is high. Therefore, impediments in the line which cause a substantial drop in pressure are not tolerated, as this pressure drop must be replaced by the compressors.

Conventional strainers cause appreciable pressure drops and, therefore, are not employed in gas transmission lines. Some means of removing foreign matter in gas transmission lines is needed. Large solids such as coupons, welding beads, etc. can find their way into compressors and ruin expensive equipment. Small solid particles and condensate may pass compressor stations but will eventually fall out in the line and reduce its effective diameter.

It is an object of this invention to provide a strainer for use in gas transmission lines which will cause only a negligible pressure drop.

Another object of this invention is to provide a strainer for use in gas transmission lines which will cause only a negligible pressure drop and which will remove both large and small particles as well as condensate in the line.

Another object is to provide a strainer which will strain out entrained small particles and condensate which pass through the opening in the strainer employed.

Other objects, features and advantages of this invention will be apparent from the specification, the drawing and the claims.

In accordance with this invention, the strainer is provided with a plate which spans the pipeline, and a large number of venturi openings are provided in the plate. Due to the well known venturi action, it is possible to strain the gas without substantially reducing its pressure. Preferably the plate having the venturi openings is inclined at an acute angle to the direction of flow which causes the gas to change directions as it passes through the plate. Thereafter, the gas is straightened out and resumes its original flow direction. However, the more dense solids and entrained liquids which are carried by the gas will continue in the changed direction due to their greater mass and inertia. In this manner they are directed against the bottom of the pipe and into a sump where they are collected for periodic straining.

Referring now to the drawings wherein there is shown an illustrative embodiment of this invention:

Figure 2:
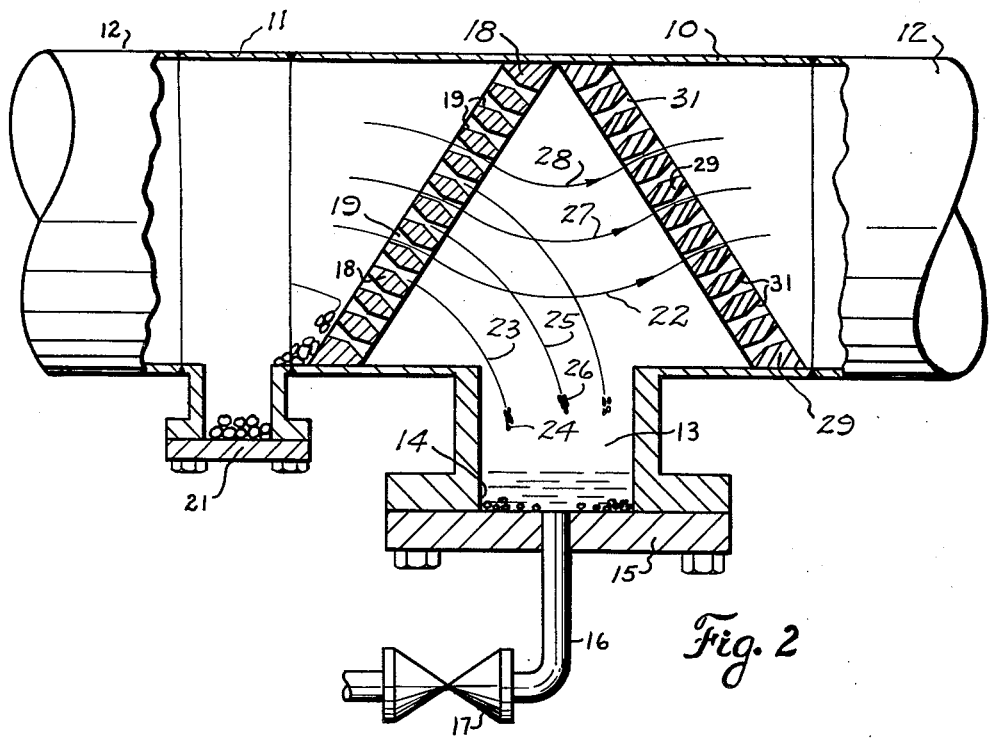
FIGURE 2 is a view on an enlarged scale partially in side elevation and partially in vertical cross section illustrating the strainer shown in FIGURE 1.
Figure 3:
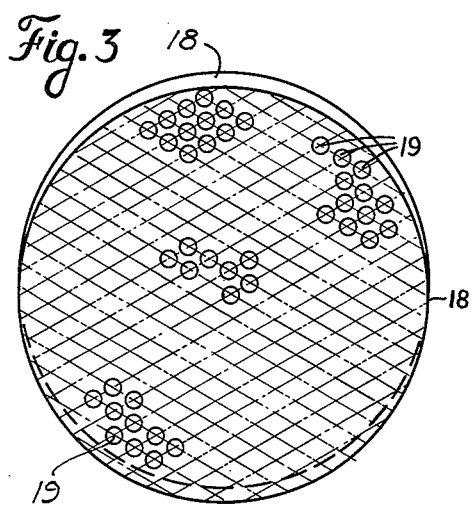
FIGURE 3 is a view in side elevation of one of the strainer plates employed in the strainer of FIGURES 1 and 2.
Figure 1:
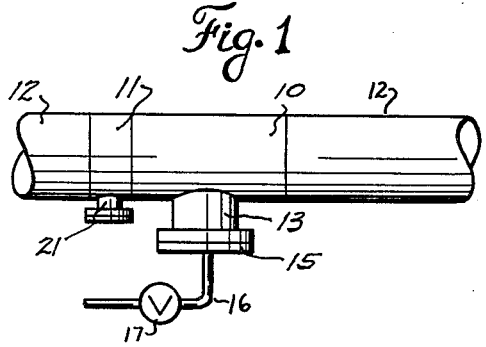
FIGURE 1 is a side elevation of a pipeline equipped with a strainer constructed in accordance with this invention.

Referring now to the drawings, the strainer includes a body made up of the tubular members 10 and 11, which are secured together in aligned relationship as by welding in the conventional manner. A one-piece body could be used if desired but a two-piece body permits better access to the interior of the body portion 10. The strainer body is secured in the pipeline 12 as by welding in the conventional manner.

The body section 10 is provided with a sump 13 for trapping small particles of solid matter and for collecting liquid knocked out of the gas stream by the strainer. This sump includes a manhole 14 closed by a lid 15 to permit cleaning out of the sump and access to the interior of the body member 10.

For ease of cleaning the sump 13, a pipe 16 is provided in the closure member 15. This pipe is controlled by valve 17 and opening of the valve will permit the gas pressure within the line to blow the accumulated liquid and small particles within the sump out through line 16. It is contemplated that this will be done at periodic intervals.

A strainer plate 18 is secured across the opening through the tubular body 10 on the upstream side of sump 13. This plate is preferably secured in place by welding it to the internal wall of the tubular body 10. Preferably the plate is inclined so that the upper end of the plate is downstream from the lower end. In other words, the most downstream end of the plate 18 is on the opposite side of the body 10 from the sump 13. By inclining the plate 18, its total area is increased.

Provision is made for gas and small entrained particles and condensate to pass through the plate 18 by a plurality of small venturi openings 19. These venturi openings function in the usual way to permit passage of fluid at increased velocity and reduced pressure and permit the recovery of substantially all of the reduced pressure after the gas has passed through the venturi. These venturi openings are sufficiently small that large particles of solids, such as welding beads, coupons and the like, will fall into the tubular body section 11 in front of the strainer plate 18. This will prevent large size foreign matter from passing through the pipe and entering compressors and other equipment which can be damaged by the solids. Preferably the body section 11 is provided with a cleanout manhole 21 to permit removal of these large particles of foreign matter.

To assist in removing small particles which pass through the venturi openings 19 and entrained liquid, the central axes of the venturi openings are inclined downwardly toward sump 14. Thus, as an entrained particle passes through a venturi opening 19, its velocity is increased due to the venturi action. After leaving the strainer plate 18, the gas increases in pressure and reduces in velocity. However, the inertia of the entrained particles and condensate will cause these particles to tend to continue in the downward path toward the sump even though the gas is straightened out and continued on down the line. This action is demonstrated by line 22 which represents gas passing on through the line and the particle trails 23 of particle 24 and particle trail 25 of particle 26. It will be appreciated that with this arrangement small solids and entrained liquids which are too small to be removed with a strainer can be removed from the gas stream.

After the gas has passed through the strainer plate 18, it is desirable to straighten out the gas stream while permitting the inertia of the entrained particles to carry them to the bottom of the pipe. This may be accomplished by any suitable mechanism which will provide straightening vanes and cause the gas to flow in the general manner shown by gas trails 22, 27 and 28. Preferably the straightening vane is provided by a second plate 29 which has a plurality of venturi openings 31 therethrough. Preferably this plate 29 is inclined in opposite manner to the plate 18, and the venturi openings are also inclined in opposite manner to the venturi openings 19 of plate 18. This arrangement will straighten out the gas flow and reduce turbulence of the gas to thereby reduce pressure drop caused by the strainer. Of course the second screen will also act as a strainer and tend to strain out any small particles which have not previously been removed from the gas stream.

The foregoing disclosure and description of the invention is illustrative and explanatory thereof and various changes in the size, shape and materials, as well as in the details of the illustrated construction, may be made within the scope of the appended claims without departing from the spirit of the invention.

What is claimed is:

1. A gas strainer comprising, a tubular body adapted to be made up in a pipeline, a sump in the body for collecting foreign matter, a strainer plate extending across the body upstream of the sump, and a plurality of venturi openings in the plate having their central axes inclined toward the sump.

2. The strainer of claim 1 wherein a cleanout manhole is provided upstream of the plate to permit removal of foreign matter which does not pass through the plate.

3. A gas strainer comprising, a tubular body adapted to be made up in a pipeline, a sump in the body for collecting foreign matter, a strainer plate extending across the body upstream of the sump, a plurality of venturi openings in the plate having their central axes inclined toward the sump, and means downstream of the plate for straightening out the gas flow.

4. A gas strainer comprising, a tubular body adapted to be made up in a pipeline, a sump in the body for collecting foreign matter, a first strainer plate extending across the body with its top positioned downstream from its bottom to provide an inclined plate, a plurality of venturi openings in the plate having their central axes inclined toward said sump, a second strainer plate positioned downstream of the sump and inclined in opposite manner to the first strainer plate, a plurality of venturi openings in the second plate inclined in opposite manner to the openings in the first plate, and a manhole upstream of the first plate to permit removal of foreign matter which does not pass through the plate.

References Cited in the file of this patent

UNITED STATES PATENTS

| | | |
|---|---|---|
| 1,593,221 | Ranyard | July 20, 1926 |
| 2,178,240 | Pascale | Oct. 31, 1939 |
| 2,246,994 | Herbster | June 24, 1941 |

FOREIGN PATENTS

| | | |
|---|---|---|
| 526,363 | Germany | June 5, 1931 |